(No Model.) 6 Sheets—Sheet 1.
T. R. JORDAN.
APPARATUS FOR THE EXTRACTION OF METALS FROM THEIR ORES.
No. 438,479. Patented Oct. 14, 1890.

(No Model.) 6 Sheets—Sheet 3.

T. R. JORDAN.
APPARATUS FOR THE EXTRACTION OF METALS FROM THEIR ORES.

No. 438,479. Patented Oct. 14, 1890.

(No Model.) 6 Sheets—Sheet 5.

T. R. JORDAN.
APPARATUS FOR THE EXTRACTION OF METALS FROM THEIR ORES.

No. 438,479. Patented Oct. 14, 1890.

(No Model.)  6 Sheets—Sheet 6.

T. R. JORDAN.
APPARATUS FOR THE EXTRACTION OF METALS FROM THEIR ORES.

No. 438,479.  Patented Oct. 14, 1890.

UNITED STATES PATENT OFFICE.

THOMAS ROWLAND JORDAN, OF LONDON, ENGLAND.

APPARATUS FOR THE EXTRACTION OF METALS FROM THEIR ORES.

SPECIFICATION forming part of Letters Patent No. 438,479, dated October 14, 1890.

Application filed October 10, 1889. Serial No. 326,557. (No model.) Patented in England March 14, 1888, No. 3,965.

*To all whom it may concern:*

Be it known that I, THOMAS ROWLAND JORDAN, engineer, a subject of the Queen of Great Britain, and a resident of London, England, have invented certain new and useful Improvements in Apparatus for the Extraction of Metals from their Ores, (for which I have obtained Letters Patent in Great Britain No. 3,965, dated March 14, 1888,) of which the following is a specification, reference being had to the accompanying drawings.

My invention relates to machinery or apparatus for extracting gold or silver from auriferous or argentiferous sand by distributing the same over the surfaces of copper plates amalgamated with mercury.

The object of my said invention is to insure a perfectly even distribution of the particles, absolute frictional contact between the particles and the surface of the plates, and also in some instances the repeated association of the particles with and their immersion in fluid mercury.

In the accompanying drawings I have shown how my said invention may be conveniently and advantageously carried into practice.

Figure 1:
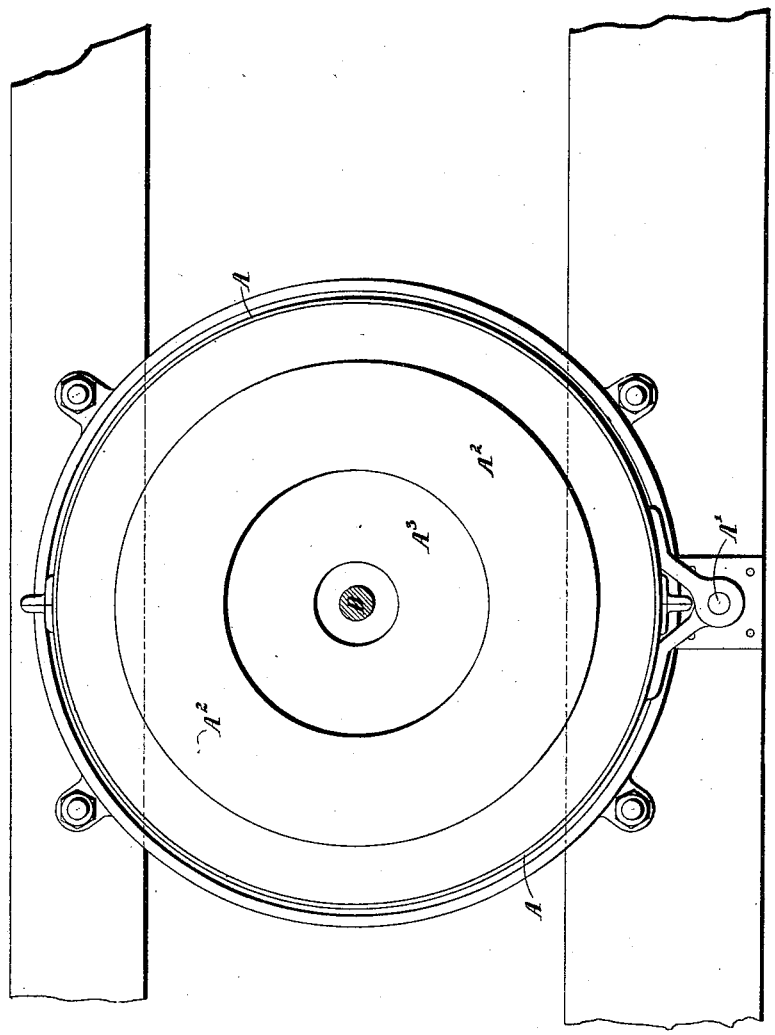
Figure 2:
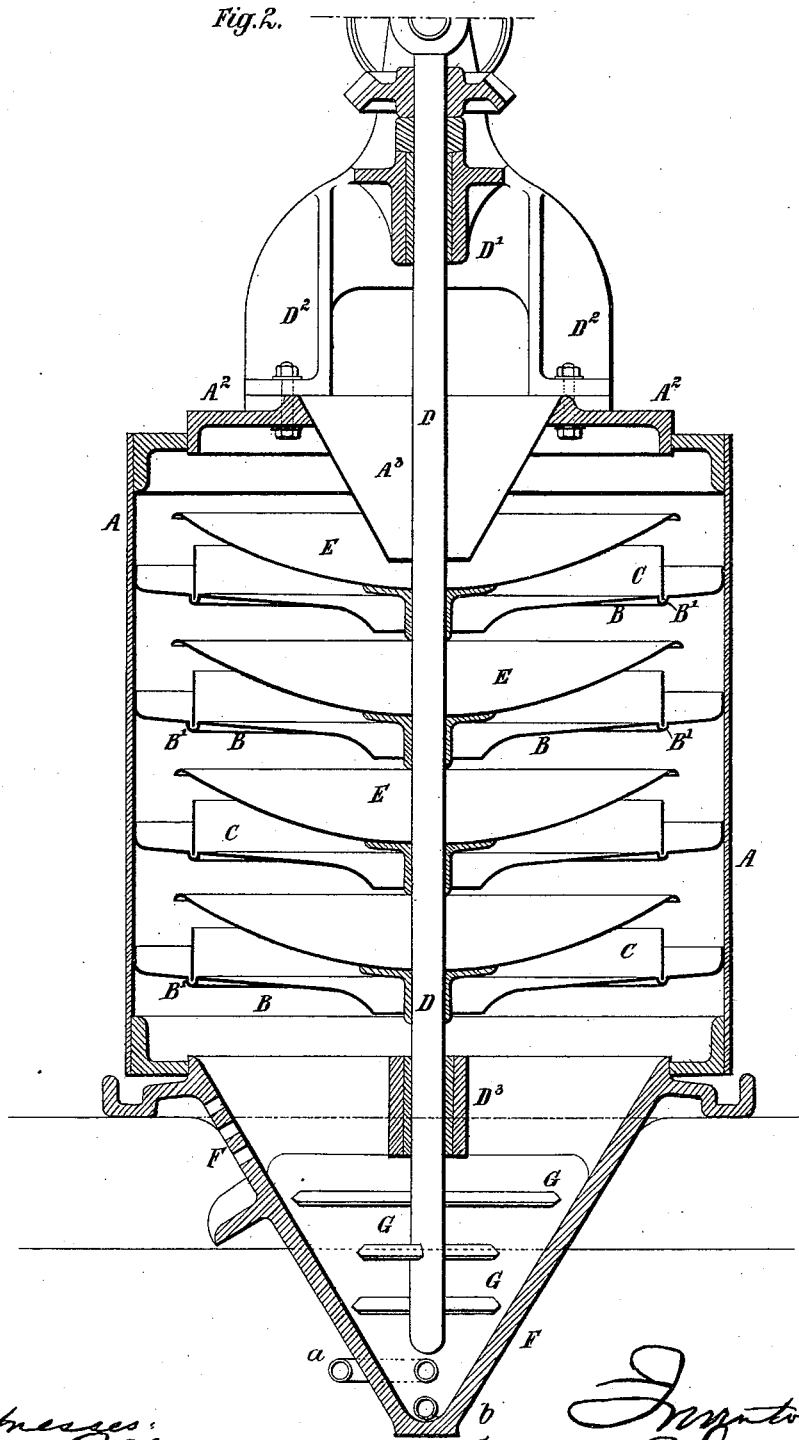
Figure 3:
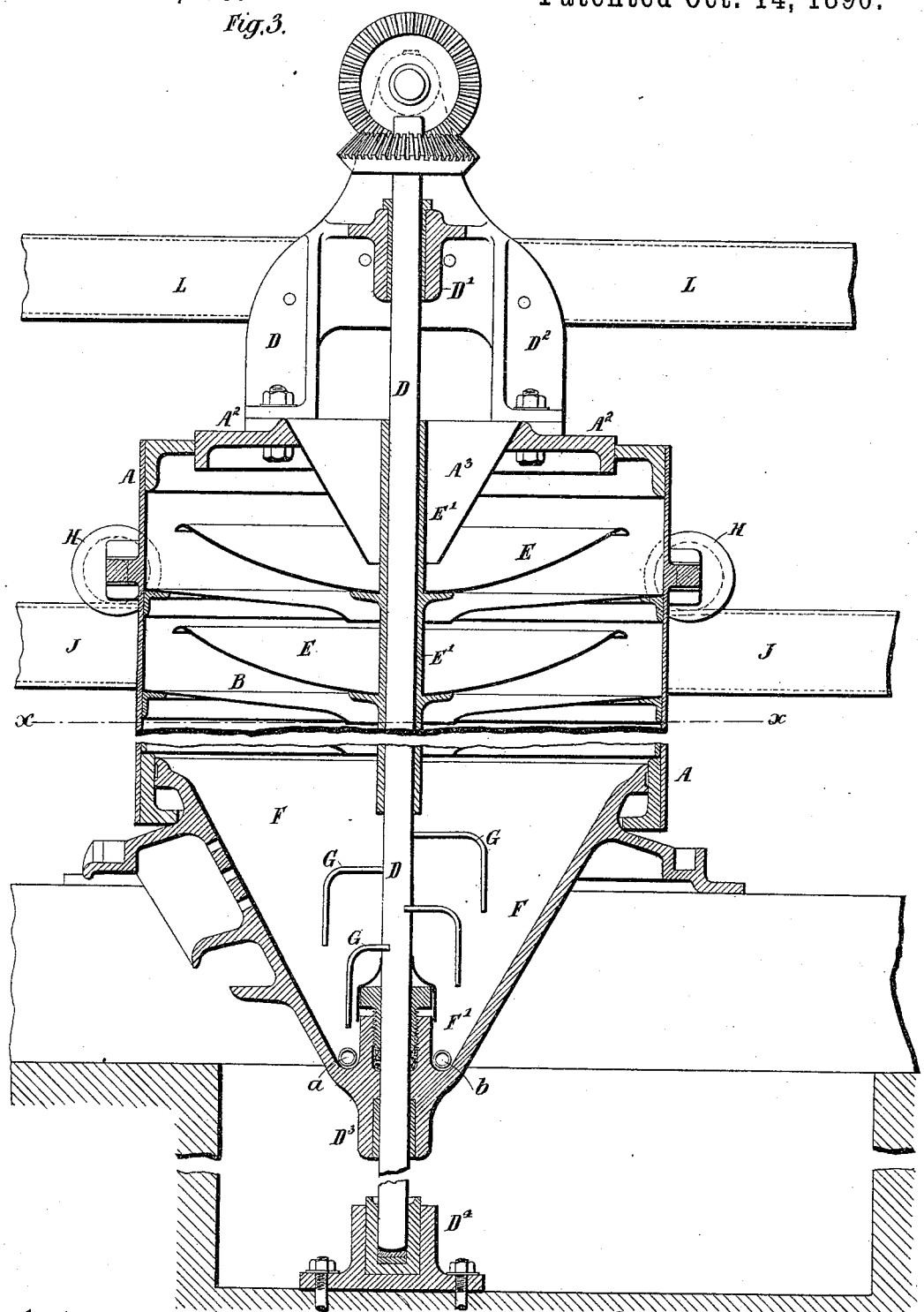
Figure 4:
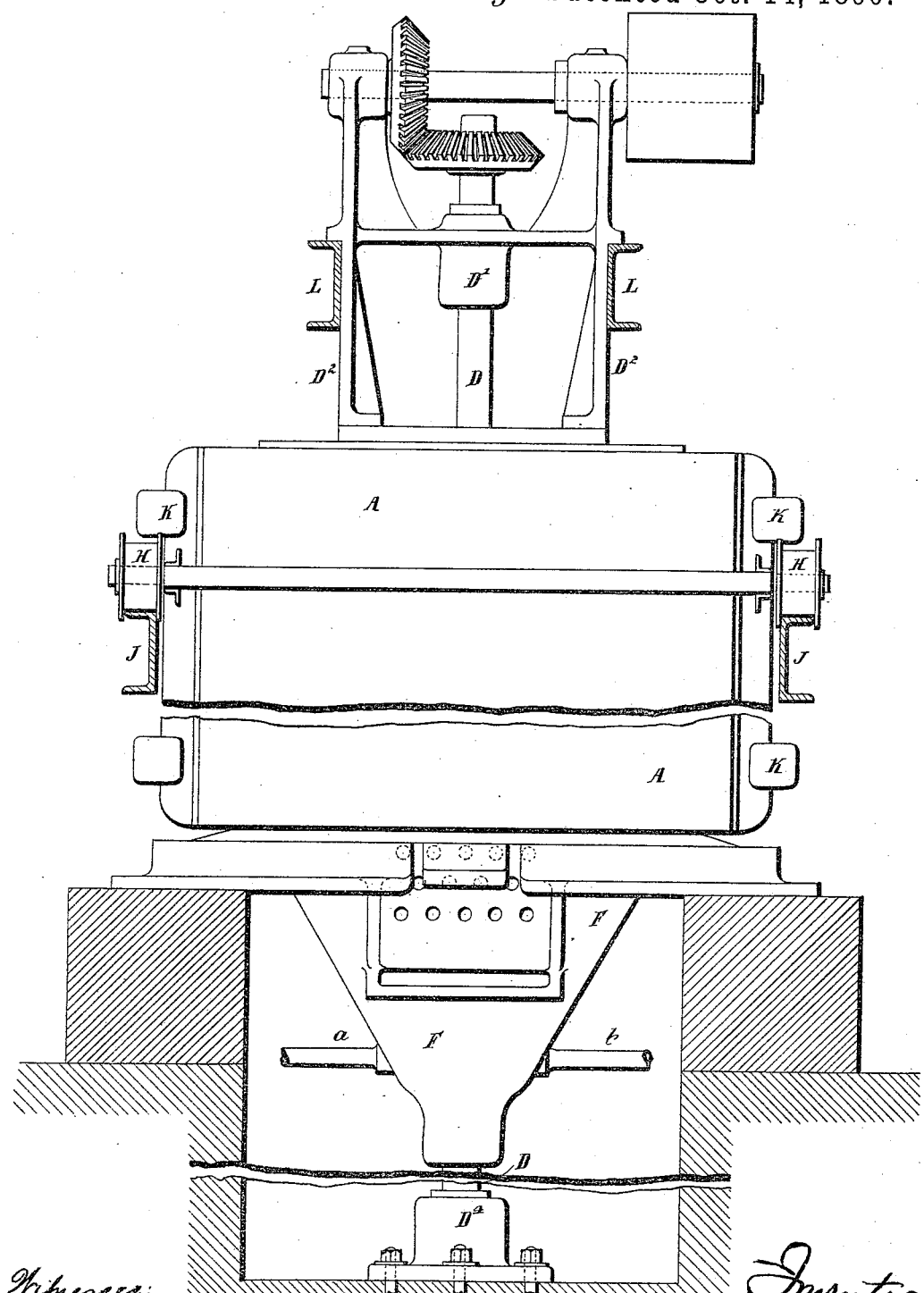
Figure 5:
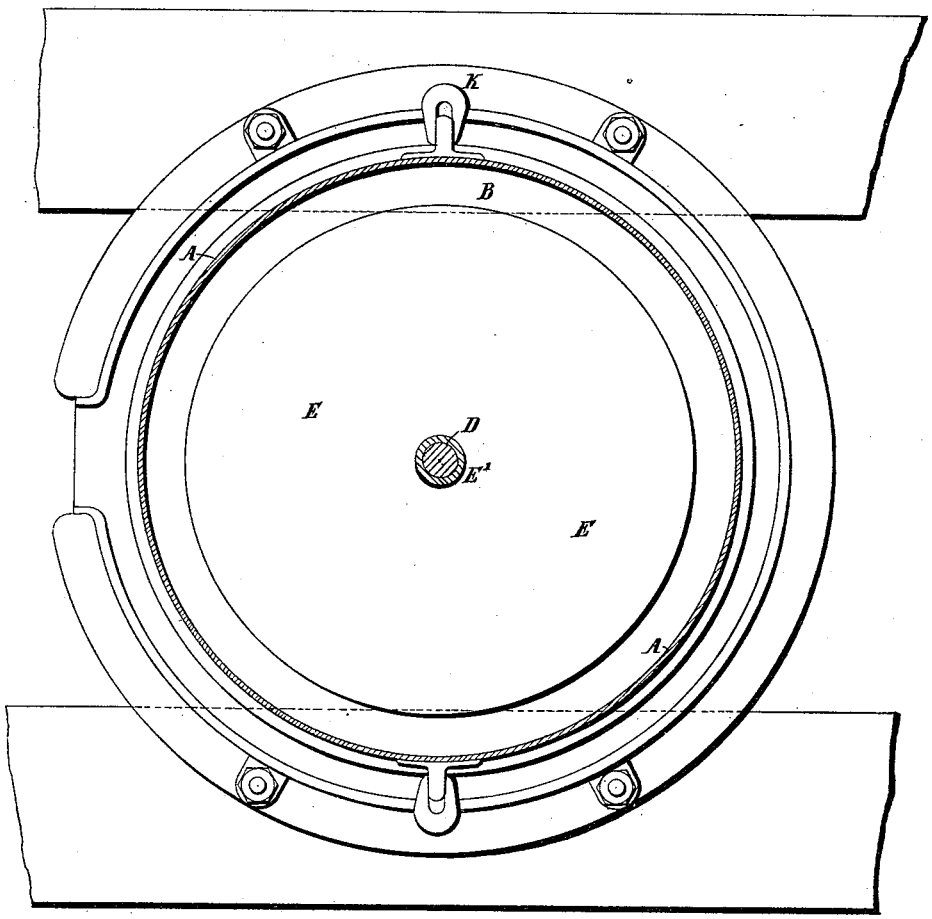
Figure 6:
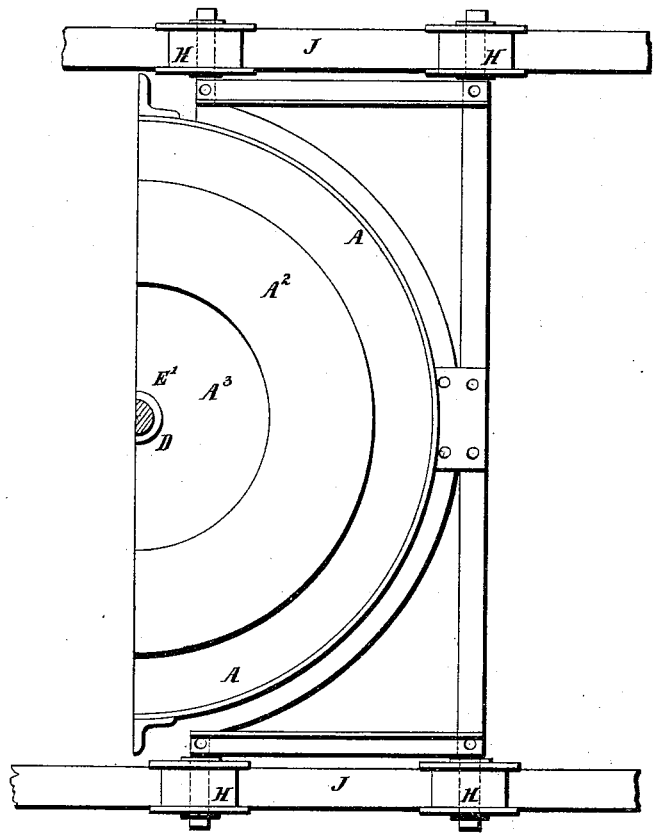
Figure 7:
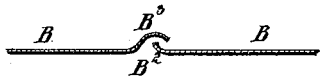

Figure 1 is a plan, and Fig. 2 a vertical central section, of one form of my improved apparatus. Fig. 3 is a vertical central section, and Fig. 4 an end elevation, partly in transverse section, showing another form or modification of the said apparatus. Fig. 5 is a horizontal section on the line $x$ $x$, Fig. 3, some of the parts being removed. Fig. 6 is a plan of portion of the apparatus shown in Figs. 3 to 5, some of the parts being removed. Fig. 7 is a vertical section illustrating a detail of construction.

A is a closed cylindrical casing in which the manipulation of the gold-bearing sand is effected and which can be secured under lock and key. This casing is constructed in halves, so connected that it can be opened and closed at will. The said casing has fixed therein, one above another, amalgamated copper plates or trays B, slightly inclining downward toward the center. In the apparatus shown in Figs. 1 and 2 there are four of these plates, and in that shown in Figs. 3 to 6 there are five of the said plates. There may, however, be any other suitable number thereof. These plates are also constructed in halves, the half-plates being attached to the halves of the casing in such a manner as to form when the casing is closed complete circular inclined trays with a hole in the center.

In the center of the casing A is arranged a vertical spindle D, to which is attached a series of dished copper plates E, also amalgamated and designed to be rotated with the said spindle. The dished plates E are so formed that the surface of each plate is nearly horizontal close to the spindle and is curved upward or becomes gradually steeper toward the edge or periphery of the plate. The said dished plates are of less diameter than the casing A, and are so fixed on the spindle that when the casing is closed around the said spindle the stationary plates B, attached to the casing A, and the rotating plates E, attached to the spindle D, are arranged alternately. A feeding hopper or funnel $A^3$ is provided in the cover $A^2$ of the said casing for the introduction of the auriferous or argentiferous sand.

At the lower end of the casing A is a conical settling-pit or concentrating-well F, having one or more outlets at different levels. At or near the bottom of this well is a pipe $a$ for the introduction of an up-current of water under pressure. The spindle D is provided with a series of arms G, which revolve with the said spindle and cause a constant agitation of the water and sand in the said well.

In the apparatus shown in Figs. 1 and 2 the two halves of the casing A are connected at one side by a vertical hinge A', and they are to be fastened together at the other side by suitable clips or clamps or in any other convenient manner.

Around the upper portion of each of the plates or trays B and near the casing A there is a deep corrugation or channel B'. When the machine is closed, these corrugations or channels form circular wells of any desired depth and width, designed to contain fluid mercury. Copper partitions C divide the surface of the mercury in these wells, and these partitions are so arranged that the sand and water in their passage over the plates B must pass under the partitions and through the mercury.

The spindle D is supported in a bearing D' in a bracket $D^2$, firmly attached to the cover $A^2$ of the casing A, and in a bearing $D^3$ at the lower end of the said casing. The arms G project radially from the spindle D, which extends to or nearly to the bottom of the well F.

The operation of the machine shown in Figs. 1 and 2 is as follows—viz: Rotary motion is imparted to the vertical spindle D either through suitable gearing or directly by a belt, and the auriferous or argentiferous sand, with a proper supply of water, is fed into the machine through the hopper $A^3$ or by means of an automatic feeder placed directly above the center of the casing. The material falls from the said hopper or feeder onto the uppermost dished plate E, which is rotated with the spindle D at a sufficient velocity to cause the particles by centrifugal force to pass up the inclined or curved surface of the said plate. The centrifugal force is naturally augmented as the distance from the center increases and, as above stated, the surface of these dished plates becomes steeper toward the periphery thereof. It follows therefore that the particles are by this means brought into frictional contact with or caused to rub forcibly against the amalgamated surface of the plates, the friction increasing in about the same ratio as the centrifugal force, which overcomes the resistance due to the increasing steepness of the surface of the dished plates. This arrangement admits of the velocity being so regulated as to impart to the sand centrifugal force just sufficient to overcome the resistance due to the varying inclination or steepness of the plates, so that the particles of sand are moved over the surface of the said plates uniformly at the velocity most favorable for the extraction of the precious metal, and the said plates are kept clean and free from oxidation. The sand is thrown off the uppermost revolving plate, and is delivered upon the stationary inclined plate B next below it. By reason of the inclination of this plate the sand and water pass by gravity through the mercury-well, above described, and over the surface of the said plate to the central hole therein and fall through the said hole upon the second revolving plate E. The same action is repeated through the entire series of plates in the machine, the precious metal being retained in the form of amalgam on the plates or in the mercury-wells. Having passed over the copper plates, the sand falls into the concentrating-well F at the lower end of the machine, the lighter portions passing away in the form of tailings with the water through one or other of the outlets, and the heavy or metallic portions and any sickened mercury or amalgam being retained in the concentrating-well, whence they may be drawn off at suitable intervals from a standpipe $b$, arranged for the purpose at the bottom of this well.

In the apparatus shown in Figs. 3 to 6 the two halves of the casing are supported by means of rollers or wheels H on girders or rails J, and are fastened together on each side by means of clips or clamps K, so that they can be readily disconnected and moved away from each other on the said girders or rails. The cover $A^2$, hopper $A^3$, and bracket $D^2$ are suitably supported by means of girders L. The shaft D extends through a stuffing-box F' at the lower end of the well F, and is supported in a step or bearing $D^4$. The arms G project radially from the said shaft for a short distance and are then bent downward. The dished plates E are suitably attached to a metal tube E', fixed upon the spindle D in any convenient manner.

The mercury-wells, hereinbefore described, are not absolutely essential to the effectual working of the machine, and I sometimes construct the said machine without them, as shown, for example, in Fig. 3. It may be advantageous to place a small quantity of fluid mercury upon each of the dished plates E.

I prefer to connect the two halves of each of the stationary plates B as shown in Fig. 7—that is to say, the adjacent edges of the said halves are bent, as at $B^2 B^3$, so that the part $B^3$ will overlap the part $B^2$ and the liquid will flow over the joint without escaping through the same—the direction of movement of the revolving plates E being as indicated by the arrow in this figure.

When treating dry sand, the inclination of the stationary plates B is increased so as to facilitate the passage of the sand over the surface of the said plates, and the well F at the bottom of the machine is replaced by delivery pipes or chambers, through which an air blast or current is passed to deliver the tailings. These pipes or chambers are fitted with conical concentrating-boxes, over which the air-current passes, and into which the heavier particles will drop.

In treating certain descriptions of ores I apply an electric current to the machine, the connections being so made that the current will flow through each revolving plate E and through any body of mercury that may be used thereon and will assist or facilitate the amalgamation.

It is obvious that I can somewhat modify the construction of my apparatus without departing from the nature of my invention.

What I claim is—

1. In a centrifugal amalgamating-machine for the extraction of precious metals from their ores, the combination of a cylinder or casing formed of two separable parts, inclined amalgamated plates formed in halves and secured to the said cylinder or casing, and provided with annular mercury-wells and with partitions for dividing the surface of the mercury therein, a rotary vertical shaft extending centrally through the said casing, and dished amalgamated plates of larger diameter than the said mercury-wells fixed on the said shaft and arranged alternately with the stationary amalgamated plates, substantially as and for the purposes set forth.

2. In a centrifugal amalgamating-machine for the extraction of precious metals from their ores, the combination of a cylinder or casing formed of two separable parts, inclined amalgamated plates formed in halves and secured to the said cylinder or casing, and provided with annular mercury-wells and with partitions for dividing the surface of the mercury therein, a rotary vertical shaft extending centrally through the said casing, dished amalgamated plates fixed on the said shaft and arranged alternately with the stationary amalgamated plates, and a conical concentrating-well fitted to the lower end of the said cylinder or casing and provided with inlet and outlet pipes or apertures, substantially as and for the purposes set forth.

3. In a centrifugal amalgamating-machine for the extraction of precious metals from their ores, the combination of a cylinder or casing A, formed in halves which are readily separable and which are provided with wheels or rollers H, rails J, on which the said halves of the casing are supported by means of the said wheels or rollers, inclined amalgamated plates B, also formed in halves and secured to the said cylinder or casing, a rotary vertical shaft D, extending centrally through the said casing, dished amalgamated plates E, fixed upon the said shaft and alternating with the said plates B, and a conical concentrating-well F, fitted in the lower end of the said casing and provided with outlet-apertures $F^2$ and with pipes $a\ b$, all substantially as and for the purposes set forth.

In testimony whereof I have hereunto signed my name in the presence of two subscribing witnesses.

THOS. ROWLAND JORDAN.

Witnesses:
THEODORE ALLPRESS,
EDMUND S. SNEWIN.